J. H. KNOWLES.
Loom-Filling Forks.
No. 139,251.  Patented May 27, 1873.
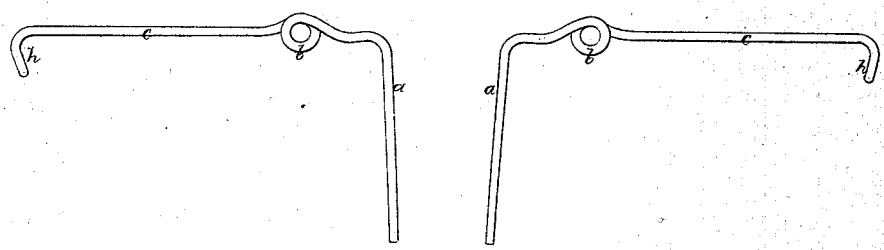
Witnesses.
S. N. Piper.
L. N. Möller.
Jacob H. Knowles.
by his attorney
R. H. Eddy

UNITED STATES PATENT OFFICE.

JACOB H. KNOWLES, OF LAWRENCE, MASSACHUSETTS.

IMPROVEMENT IN LOOM-FILLING FORKS.

Specification forming part of Letters Patent No. 139,251, dated May 27, 1873; application filed August 2, 1871.

*To all whom it may concern:*

Be it known that I, JACOB H. KNOWLES, of Lawrence, in the county of Essex and State of Massachusetts, have invented an Improved Manufacture of Stop-Motion Fork for Looms; and do hereby declare the same to be fully described in the following specification and represented in the accompanying drawing, of which—

Figures 1 and 2 are top views of loom-forks, made in accordance with my invention. Fig. 3 is a side view of each.

The purpose of the present invention is to provide the loom-fork, for which Letters Patent No. 114,307, dated May 2, 1871, were granted to me, with one or more additional prongs or tines, it frequently being desirable to have a fork with more than two tines.

To this end, in carrying out my invention, I combine, with the patented fork, one or more auxiliary tines, provided with a helical spring to each and with a supporting tang, all formed of wire, bent in manner as represented. The tang is inserted between and soldered to the branches of the tang or shank of the main fork, so as to bring the coiled springs of the auxiliary tines between and in line with those of the main lines, as shown in the drawing, in which $a\ a$ are the main tines, $b\ b$ their springs, and $c$ their shank.

The auxiliary tine is shown in Fig. 1 at $d$, its spring at $e$, and tang at $f$.

In Fig. 2 the auxiliary tines are shown at $d\ d'$, their springs at $e\ e'$ and their tang at $f$, the solder being shown in each figure at $g$.

The shank may be made either with or without the band or hook $h$.

From the above it will be seen that to each auxiliary tine there is a helical spring, like that of each main tine, and that these springs compose the bearing in which the fork is supported on its pivot or pin in a loom.

From the above it will be seen that, in making my present fork, I have taken two forks analogous to that heretofore patented to me, and so arranged one within the other that the tang of one is within the tang of the other, and the coil $e$, or coils $e\ e'$, of one are between and in line with the coils $b\ b$ of the other; and, also, that the prong or prongs of the intermediate fork are between those of the other, their tangs being joined by solder. The article so made is a new manufacture.

What, therefore, I claim is—

The new manufacture of filling-fork, composed of the two wire forks, constructed, arranged, and combined together in manner substantially as specified.

J. H. KNOWLES.

Witnesses:
R. H. EDDY,
J. R. SNOW.